July 3, 1928.
W. JENNINGS ET AL
1,675,494
SCREW AND NUT GEARING
Filed Jan. 5, 1927
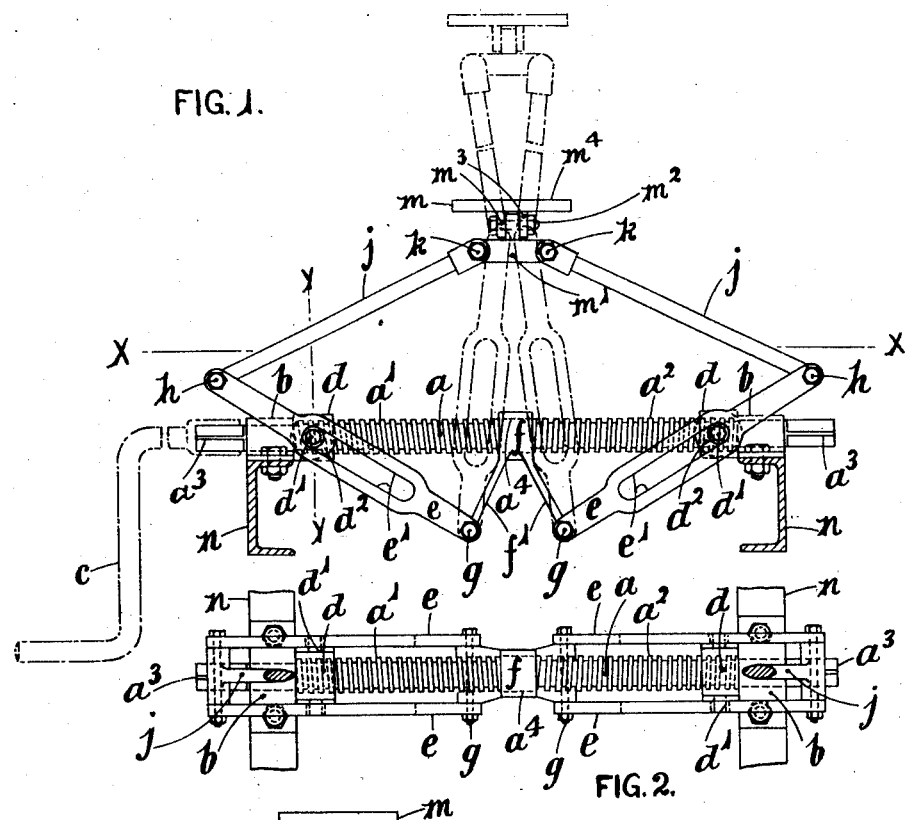
FIG. 1.
FIG. 2.
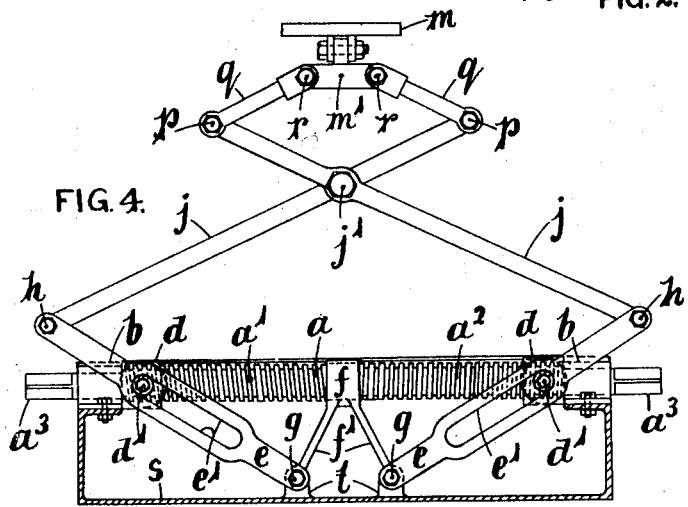
FIG. 4.
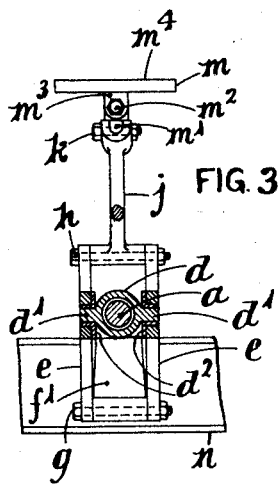
FIG. 3
INVENTORS:
William Jennings & George Jennings
BY Toulmin & Toulmin
ATTORNEYS.

Patented July 3, 1928.

1,675,494

UNITED STATES PATENT OFFICE.

WILLIAM JENNINGS AND GEORGE JENNINGS, OF MORPETH, ENGLAND.

SCREW AND NUT GEARING.

Application filed January 5, 1927, Serial No. 159,156, and in Great Britain December 10, 1926.

This invention relates to screw-and-nut gearing such as is employed for raising and lowering the hinged bodies of tipping vehicles, and has for its object to provide an improved construction which is particularly suitable for the above purpose and is also applicable to lifting jacks and similar devices wherein a rotary motion is converted into a rectilinear motion.

Screw-and-nut gearing in accordance with our invention comprises a suitably supported right- and left-hand threaded spindle having a nut on each threaded portion, said nuts co-acting with pairs of parallel guides which are pivotally anchored at one end and pivotally connected to links at their other ends, one nut lying between each pair of guides, said guides and links together forming a closed four-sided link-work which, by revolving the threaded spindle, can be moved from a position in which the pivots connecting the guides to the links are at a maximum distance apart to one in which said pivots are close together. The free ends of the links may be pivotally attached to a head attached to or co-acting with the member to be raised and lowered, or a plurality of crossed links may be interposed between said first pair of links and said head to increase the effective lift of the device.

We will fully describe our invention with reference to the accompanying drawings wherein Figure 1 is an elevation, Figure 2 a plan section on the line X—X and Figure 3 a vertical section in the line Y—Y in Fig. 1. Figure 4 is a similar view to Fig. 1 illustrating a modified construction.

Referring to Figs. 1, 2 and 3 of the said drawings, in the example therein illustrated $a$ is a spindle having a right-hand threaded portion $a^1$ and a left-hand threaded portion $a^2$ and supported by bearings $b$. The spindle $a$ has squared ends $a^3$ on to either of which can be fitted a crank handle $c$ as shown in dot-and-dash lines in Fig. 1 whereby the spindle can be revolved. On each threaded portion of the spindle $a$ is a nut $d$ formed with laterally-projecting pins $d^1$ on which are mounted flanged rollers $d^2$ each engaging an elongated slot $e^1$ in a guide $e$. The nuts $d$ travel between the bearings $b$ and a central sleeve $f$ on a plane portion $a^4$ of the spindle $a$, the nuts being disposed symmetrically on the spindle. The sleeve $f$ is free to rotate but not to slide on the spindle $a$, and is provided with depending arms $f^1$ which support pivot pins $g$ on which the lower ends of the pairs of guides $e$ are anchored. At their upper ends the guides $e$ are connected by pivots $h$ to links $j$ which in turn are pivoted at $k$ to a head $m$ comprising a T-piece $m^1$ pivoted at $m^2$ to lugs $m^3$ on the underside of a plate $m^4$.

When the nuts $d$ are at their maximum distance apart as shown in full lines in Fig. 1, the head $m$ is in its lowest position, but, as the spindle $a$ is revolved to move the nuts together, their rollers $d^2$ travel in the slots $e^1$ in the guides $e$ and draw the pivots $h$ together until, when the nuts are closest together, as shown in dot-and-dash lines in Fig. 1, the guides $e$ and links $j$ are upright and the head $m$ is raised to its maximum height.

As applied to the chassis of a motor or other road vehicle or a rail vehicle for the purpose of raising and lowering the free end of a hinged tipping body thereon, the bearings $b$ are mounted on the side frames $n$ of the chassis of the vehicle, the spindle lying transversely of the chassis, the plate $m^4$ of the head $m$ being attached to the underside of the tipping body in the centre adjacent to its free end. As the guides are anchored at $g$ to the central sleeve $f$, the guides, links $j$ and head $m$ can oscillate about the spindle $a$ to suit the arc through which the end of the tipping body travels.

Referring to Fig. 4, where the greater travel of the head $m$ is desired, the links $j$ may be extended and crossed, being pivoted together at $j^1$ where they cross, and their upper ends may be pivoted at $p$ to links $q$ which in turn are pivoted at $r$ to the T-piece $m^1$ of the head $m$.

As applied to a lifting jack, the bearings $b$ of the spindle $a$ are carried by a box $s$ as shown in Fig. 4, the pivots $g$, anchoring the guides $e$ to the depending arms $f^1$ of the sleeve $f$, being passed through lugs $t$ on the bottom of the box $s$ to prevent oscillation about the spindle $a$.

It will be observed that our improved screw-and-nut gearing is balanced in action, and, by providing the spindle $a$ with threads of suitable pitch, the head $m$ can be rapidly moved from its lowest to its highest position, and vice versa, with a minimum expenditure of power. The maximum lifting power is exerted at the commencement of the lift, the distance travelled by the nuts $d$ for each inch of vertical lift of the head $m$ being at its maximum when the nuts are farthest apart, said distance progressively decreasing as the nuts approach; that is to say, the speed of rotation of the spindle being constant, the lift of the head $m$ is slow at first and gradually increases in speed as it approaches its maximum height. The gear is non-slipping and is self-supporting in any position. It is of light weight in comparison with the power obtained, and can be readily and cheaply manufactured.

What we claim as our invention, and desire to secure by Letters Patent is:—

1. Screw-and-nut gearing comprising a right- and left-hand threaded spindle, bearings for said spindle, means for supporting said bearings, nuts on the threaded portions of said spindle, guides co-acting with said nuts, a sleeve on said spindle centrally of its threaded portions, arms on said sleeve, the ends of said guides being pivoted to said arms, links pivoted at one end to the other ends of said guides, and a head pivotally connected to the other ends of said links, said guides and links together forming a closed four-sided link-work.

2. Screw-and-nut gearing comprising a right- and left-hand threaded spindle, bearings for said spindle, means for supporting said bearings, nuts on the threaded portions of said spindle, said nuts having laterally projecting pins, rollers on said pins, slotted guides co-acting with said rollers, a sleeve on said spindle centrally of its threaded portions, arms on said sleeve, the ends of said guides being pivoted to said arms, links pivoted at one end to the other ends of said guides, and a head pivotally connected to the other ends of said links, said guides and links together forming a closed four-sided link-work.

In testimony whereof, we affix our signatures.

WILLIAM JENNINGS.
GEORGE JENNINGS.